(12) United States Patent
Wang

(10) Patent No.: US 9,901,085 B2
(45) Date of Patent: Feb. 27, 2018

(54) FISHING REEL DRAG KNOB ASSEMBLY CAPABLE OF SHOWING FORCE

(71) Applicant: Weihai Langbao Fishing Tackle Co., Ltd., Weihai, Shandong (CN)

(72) Inventor: Xiren Wang, Shandong (CN)

(73) Assignee: Weihai Langbao Fishing Tackle Co., Ltd., Shandong (CN)

( * ) Notice: Subject to any disclaimer, the term of this patent is extended or adjusted under 35 U.S.C. 154(b) by 0 days.

(21) Appl. No.: 15/091,162

(22) Filed: Apr. 5, 2016

(65) Prior Publication Data
US 2017/0049088 A1    Feb. 23, 2017

(30) Foreign Application Priority Data

Aug. 17, 2015  (CN) ..................... 2015 2 0617428 U

(51) Int. Cl.
 *A01K 89/01*  (2006.01)
 *A01K 89/033*  (2006.01)
 *A01K 89/027*  (2006.01)

(52) U.S. Cl.
 CPC .......... *A01K 89/033* (2013.01); *A01K 89/027* (2013.01)

(58) Field of Classification Search
 CPC .... A01K 89/01; A01K 89/027; A01K 89/028; A01K 89/03
 See application file for complete search history.

(56) References Cited

U.S. PATENT DOCUMENTS 3,946,963 A * 3/1976 Oberg .................... A01K 89/01
                                                      242/232
4,702,431 A * 10/1987 Kaneko ................ A01K 89/027
                                                      242/245
(Continued)

FOREIGN PATENT DOCUMENTS

CN         1371600 A      10/2002
CN         2532690 Y       1/2003
(Continued)

OTHER PUBLICATIONS

Intellectual Property Office of the People's Republic of China, Office Action issued in Chinese Patent Application No. 201510502983.3 (dated Feb. 28, 2017).
(Continued)

*Primary Examiner* — Emmanuel M Marcelo
(74) *Attorney, Agent, or Firm* — Leydig, Voit & Mayer, Ltd.

(57) ABSTRACT

Disclosed is a fishing reel drag knob assembly capable of showing force, including a drag knob cover and a drag knob, the drag knob cover engages with a main shaft and is configured to be moved along an axial direction of the main shaft, an outer end face of the drag knob cover acts on a drag system, wherein a drag knob cover propulsion component is arranged between the drag knob cover and the drag knob, the drag knob is configured to be rotated to adjust an acting force of the drag knob cover propulsion component on the drag knob cover, so as to adjust an acting force of the drag knob cover on the drag system, an outside diameter of the drag knob cover is larger than the outside diameter of the drag knob, and force application scales are arranged on the drag knob cover.

4 Claims, 2 Drawing Sheets

(56) References Cited

U.S. PATENT DOCUMENTS

| | | | |
|---|---|---|---|
| 4,804,150 A * | 2/1989 | Takeuchi | A01K 89/02 188/166 |
| 4,930,723 A * | 6/1990 | Toda | A01K 89/027 242/223 |
| 5,312,067 A | 5/1994 | Sugawara et al. | |
| 5,370,329 A * | 12/1994 | Kono | A01K 89/027 116/309 |
| 5,560,562 A * | 10/1996 | Hartmann | A01K 89/015 192/111.1 |
| 2004/0206840 A1 | 10/2004 | Kitajima | |
| 2008/0290202 A1 * | 11/2008 | Ochiai | A01K 89/0111 242/246 |

FOREIGN PATENT DOCUMENTS

| | | |
|---|---|---|
| CN | 201091163 Y | 7/2008 |
| JP | H03-058968 U | 6/1991 |
| JP | 2014-168423 A | 9/2014 |

OTHER PUBLICATIONS

Intellectual Property Office of the People's Republic of China, Office Action issued in Chinese Patent Application No. 201510502983.3 (dated Aug. 3, 2017).

European Patent Office, Search Report issued in European Patent Application No. 16165499.1 (dated Dec. 21, 2016).

\* cited by examiner

FISHING REEL DRAG KNOB ASSEMBLY CAPABLE OF SHOWING FORCE

CROSS-REFERENCE TO RELATED APPLICATIONS

This patent application claims the benefit of Chinese Patent Application No. 201520617428.0, filed Aug. 17, 2015, which is incorporated by reference.

FIELD OF THE INVENTION

The present invention relates to a drag knob assembly, and in particular, to a drag knob assembly of a spinning wheel type fishing reel, which releases a fishing line from the front side, and to a fishing reel drag knob assembly capable of showing force.

BACKGROUND OF THE INVENTION

Generally speaking, a main shaft of a spinning wheel type fishing reel can move back and forth under the drive of a machine body assembly, but cannot rotate, a drag system is arranged between a line spool and the main shaft, and the line spool can move back and forth under the drive of the main shaft. During take-up, a pressure needs to be applied to the drag system via a drag knob assembly to increase the rotation resistance of the line spool, and the line spool cannot rotate within a certain stress range, so that the take-up function is satisfied. During pay-off, the pressure applied to the drag system needs to be reduced via the drag knob assembly to reduce the rotation resistance of the line spool, so that the line spool can freely rotate to guarantee to freely release a fishing line under certain tension.

The existing drag knob assembly structure available on the market cannot indicate the rotation angle of the drag knob assembly, so that the size of the resistance applied to the line spool cannot be determined, in this case, the drag knob assembly structure is poor in force adjustment accuracy and is inconvenient to use.

SUMMARY OF THE INVENTION

Technical problems to be solved in the present invention are that the performance of a drag knob assembly of a spinning wheel type fishing reel is poor and the size of resistance applied to a line spool cannot be accurately judged.

The solution for solving the technical problems in the present invention is as follows: a fishing reel drag knob assembly capable of showing force includes a drag knob cover and a drag knob, the drag knob cover engages with a main shaft and is configured to be moved along an axial direction of the main shaft, an outer end face of the drag knob cover acts on a drag system, a drag knob cover propulsion component is arranged between the drag knob cover and the drag knob, the drag knob is configured to be rotated to adjust an acting force of the drag knob cover propulsion component on the drag knob cover, so as to adjust an acting force of the drag knob cover on the drag system, an outside diameter of the drag knob cover is larger than the outside diameter of the drag knob, and force application scales are arranged on the drag knob cover.

Further, a click system is arranged between the drag knob and the drag knob cover.

Further, the drag knob cover propulsion component includes a nut and a spring, the nut is installed in the drag knob, one end of the spring abuts on the nut, the other end of the spring is abuts on an inner wall of the drag knob cover, an end of the main shaft penetrates through a center hole of the drag knob cover, and threads on the end of the main shaft engage with the nut. As a preferred manner, the center hole of the drag knob cover is an elongate hole.

The drag knob assembly of the present invention has a simple structure, the drag knob can only rotate relative to the drag knob cover, and scale marks are arranged on the drag knob cover to accurately display the relative rotation angle of the drag knob and the drag knob cover. Since when rotating, the drag knob transmits force through the drag system to prevent the line spool from rotating, users can accurately judge the size of resistance applied to the line spool by adjusting the rotation angle of the drag knob, so as to conveniently control the take-up and pay-off of a fishing reel.

BRIEF DESCRIPTION OF THE DRAWINGS

In FIG. 1 to FIG. 4, marks in the accompanying drawings are respectively as follows: 1 represents a drag knob assembly, 2 represents a line spool, 3 represents a drag system, 4 represents a main shaft, 5 represents a machine body assembly, 6 represents a rotor, 7 represents a fishing line, 11 represents a drag knob, 12 represents a drag knob cover, 13 represents a click system, 14 represents a screw, 15 represents a center hole, 16 represents a spring, 17 represents a nut, 18 represents force application scales, and 19 represents a hole.

DETAILED DESCRIPTION OF THE EMBODIMENTS

Figure 1:
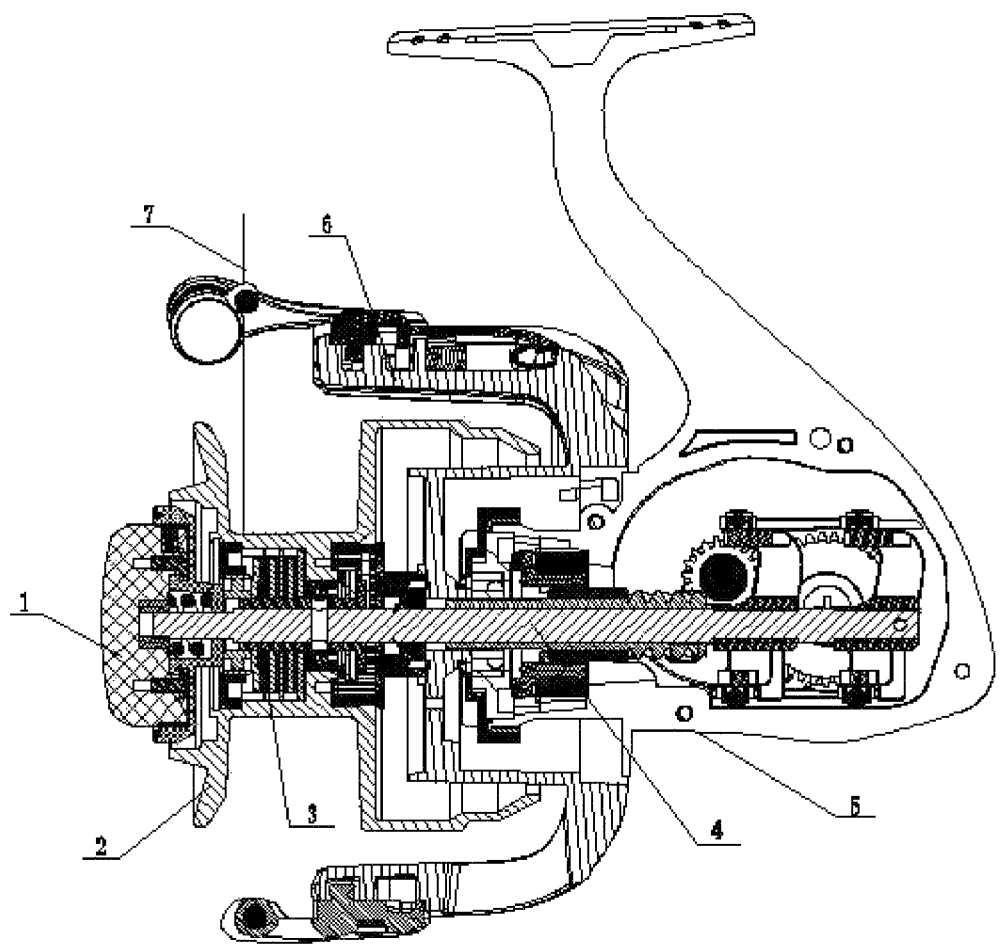
FIG. 1 is a schematic diagram of the use of a drag knob assembly of the present invention.

As shown in FIG. 1, a drag knob assembly 1 is installed on a main shaft 4 of a fishing reel, the main shaft 4 is configured to be moved back and forth under the drive of a machine body assembly 5, but to cannot rotate, and a line spool 2 is configured to be moved back and forth under the drive of the main shaft 4. The drag knob assembly 1 acts on a drag system 3 arranged between the line spool 2 and the main shaft 4 to adjust the rotation resistance of the line spool 2, so as to control the take-up and pay-off of a fishing line 7. During take-up, the pressure applied by the drag knob assembly 1 to the drag system 3 is enlarged, the rotation resistance of the line spool 2 is enlarged, the line spool 2 cannot rotate within a certain stress range, and a rotor 6 rotates to twist the fishing line 7 in a line slot of the line spool 2. During pay-off, the pressure applied by the drag knob assembly 1 to the drag system 3 is reduced, the rotation resistance of the line spool 2 is reduced, the line spool 2 can freely rotate, and the fishing line 7 is released.

Figure 2:
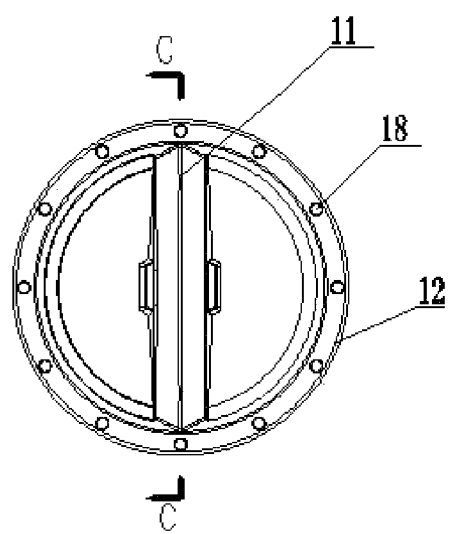
FIG. 2 is a front view of the drag knob assembly of the present invention.
Figure 3:
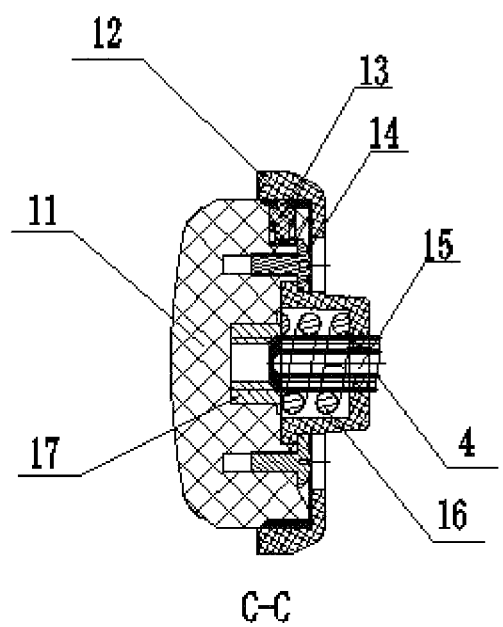
FIG. 3 is a C-C sectional view in FIG. 2.
Figure 4:
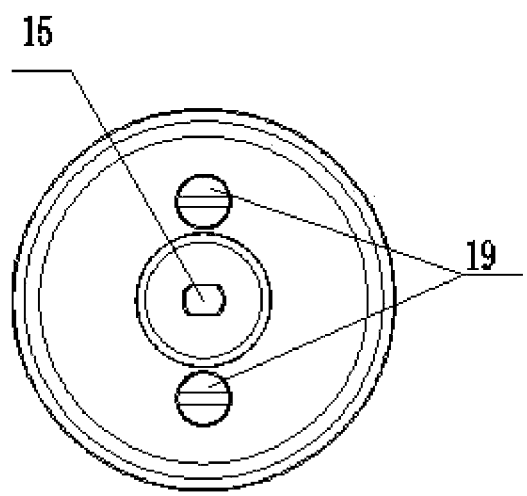
FIG. 4 is a rear view of the drag knob assembly of the present invention.

FIG. 2 to FIG. 4 show a preferred embodiment of a drag knob assembly of the present invention. The drag knob assembly 1 includes a drag knob cover 12 and a drag knob 11, an outside diameter of the drag knob cover 12 is larger than the outside diameter of the drag knob 11, and force application scales 18 are arranged on the drag knob cover 12. A nut 17 is arranged in the drag knob 11, a screw 14 penetrates through a hole 19 on the drag knob cover 12 to connect the drag knob cover 12 onto the drag knob 11, in this way, the drag knob 11, the nut 17 and the screw 14 form an entirety and can rotate. A spring 16 is installed between the nut 17 and the drag knob cover 12, one end of the spring 16 abuts on the nut 17, the other end of the spring 16 abuts on an inner wall of the drag knob cover 12, an end of the main shaft 4 penetrates through a center hole 15 of the drag knob cover 12, threads on the end of the main shaft 4 engage with the nut 17, and the nut 17 and the spring 16 form a propulsion component of the drag knob cover 12.

The drag knob 11 can be rotated to adjust an acting force of the outer surface of the drag knob cover 12 on the drag system 3. The force application scales 18 on the drag knob cover 12 accurately display the relative rotation angle of the drag knob 11 and the drag knob cover 12. Since when rotating, the drag knob 11 transmits force to the line spool 2 through a screw thread fit and the drag system 3, users can accurately control the resistance applied to the line spool 2 by adjusting the rotation angle of the drag knob 11. The force application scales 18 on the drag knob cover 12 is corresponding to the braking force applied to the line spool 2. Within a certain range of the braking force, each scale interval passed by the rotated drag knob 11 represents a change of the braking force. The changes represented by all scale intervals are approximately equal. As a result, it is easy to adjust the braking force applied to line spool 2 during fishing.

In addition, a click system 13 is arranged between the drag knob 11 and the drag knob cover 12 for prompting rotation when the drag knob 11 is rotated.

The invention claimed is:

1. A fishing reel drag knob assembly capable of showing force, comprising a drag knob cover and a drag knob, the drag knob cover engages with a main shaft and is configured to be moved along an axial direction of the main shaft, an outer end face of the drag knob cover acts on a drag system, wherein a drag knob cover propulsion component is arranged between the drag knob cover and the drag knob, the drag knob is configured to be rotated to adjust an acting force of the drag knob cover propulsion component on the drag knob cover, so as to adjust an acting force of the drag knob cover on the drag system, an outside diameter of the drag knob cover is larger than an outside diameter of the drag knob, and force application scales are arranged on the drag knob cover.

2. The fishing reel drag knob assembly capable of showing force of claim 1, wherein a click system is arranged between the drag knob and the drag knob cover.

3. The fishing reel drag knob assembly capable of showing force of claim 1, wherein the drag knob cover propulsion component comprises a nut and a spring, the nut is installed in the drag knob, one end of the spring abuts on the nut, the other end of the spring abuts on an inner wall of the drag knob cover, an end of the main shaft penetrates through a center hole of the drag knob cover, and threads on the end of the main shaft engage with the nut.

4. The fishing reel drag knob assembly capable of showing force of claim 3, wherein the center hole of the drag knob cover is an elongate hole.

* * * * *